US011068351B2

(12) United States Patent
Lorenz et al.

(10) Patent No.: US 11,068,351 B2
(45) Date of Patent: Jul. 20, 2021

(54) DATA CONSISTENCY WHEN SWITCHING FROM PRIMARY TO BACKUP DATA STORAGE

(71) Applicant: International Business Machines Corporation, Armonk, NY (US)

(72) Inventors: Dean Har'el Lorenz, Haifa (IL); Roie Melamed, Haifa (IL); Alexey Roytman, Givat Elah (IL); Aidan Shribman, Ganei Tikva (IL)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 16/194,467

(22) Filed: Nov. 19, 2018

(65) Prior Publication Data

US 2020/0159626 A1    May 21, 2020

(51) Int. Cl.
*G06F 11/00* (2006.01)
*G06F 11/14* (2006.01)
(Continued)

(52) U.S. Cl.
CPC ...... *G06F 11/1464* (2013.01); *G06F 11/1451* (2013.01); *G06F 11/1662* (2013.01);
(Continued)

(58) Field of Classification Search
CPC ............. G06F 11/2069; G06F 11/1469; G06F 11/2023; G06F 11/2082; G06F 11/2094;
(Continued)

(56) References Cited

U.S. PATENT DOCUMENTS 5,574,874 A * 11/1996 Jones .................. G06F 11/1407
711/100
5,799,322 A * 8/1998 Mosher, Jr. ......... G06F 11/2074
(Continued)

FOREIGN PATENT DOCUMENTS

CN           106850315       6/2017
KR        1020140116498    10/2014

OTHER PUBLICATIONS

Xiaofang Zhang et al., "Research on the recovery strategy of incremental-data-based continuous data protection", 2012 International Conference on Computer Science and Electronics Engineering, 2012, pp. 498-502.

*Primary Examiner* — Loan L. T. Truong
(74) *Attorney, Agent, or Firm* — Dan Swirsky

(57) ABSTRACT

Switching from primary to backup data storage by preparing a backup copy of multiple data sets, where, prior to the preparing, the backup copy is updated in accordance with a backup protocol specifying synchronously updating the backup copy to reflect changes made to one type of data stored in a primary copy of the data sets, and asynchronously updating the backup copy to reflect changes made to another type of data stored in the primary copy, and where the preparing includes identifying any inconsistency in any interdependent data in the data sets of the backup copy in accordance with a predefined schema of interdependent data in the data sets, and correcting any identified inconsistency in the data sets of the backup copy in accordance with a predefined inconsistency correction protocol, and causing the backup copy to be used in place of the primary copy for directly servicing data transactions.

20 Claims, 5 Drawing Sheets

(51) Int. Cl.
*G06F 11/16* (2006.01)
*G06F 11/20* (2006.01)

(52) U.S. Cl.
CPC ...... *G06F 11/2064* (2013.01); *G06F 11/2069* (2013.01); *G06F 11/2094* (2013.01); *G06F 11/2097* (2013.01); *G06F 2201/82* (2013.01); *G06F 2201/835* (2013.01)

(58) Field of Classification Search
CPC ............ G06F 2201/82; G06F 11/1451; G06F 11/1471; G06F 11/2074; G06F 11/2076; G06F 16/178; G06F 3/065; G06F 11/0793; G06F 11/1458; G06F 11/1461; G06F 16/275
See application file for complete search history.

(56) References Cited

U.S. PATENT DOCUMENTS

| | | | | |
|---|---|---|---|---|
| 7,003,692 | B1* | 2/2006 | Banks | G06F 11/2038 713/1 |
| 7,925,917 | B1* | 4/2011 | Roy | G06F 11/2094 714/4.11 |
| 8,918,606 | B1* | 12/2014 | Stringham | G06F 11/1469 711/162 |
| 9,442,748 | B2 | 9/2016 | Burshan et al. | |
| 9,489,268 | B2 | 11/2016 | Babashetty et al. | |
| 9,491,107 | B1* | 11/2016 | Scudder | H04L 45/16 |
| 9,632,892 | B1* | 4/2017 | Sledz | G06F 16/178 |
| 10,002,052 | B1 | 6/2018 | Lyadvinsky et al. | |
| 10,534,547 | B2* | 1/2020 | Meiri | G06F 3/067 |
| 2003/0177145 | A1* | 9/2003 | Lohn | G06F 11/1469 |
| 2004/0268116 | A1* | 12/2004 | Vasisht | G06F 11/1417 713/100 |
| 2005/0055521 | A1* | 3/2005 | Saika | G06F 11/1032 711/162 |
| 2005/0071708 | A1* | 3/2005 | Bartfai | G06F 11/2064 714/6.3 |
| 2005/0160242 | A1* | 7/2005 | Griffin | G06F 11/2064 711/162 |
| 2005/0187777 | A1* | 8/2005 | Chevallier | H04W 88/181 704/500 |
| 2006/0143497 | A1* | 6/2006 | Zohar | G06F 11/2058 714/6.23 |
| 2006/0218363 | A1* | 9/2006 | Palapudi | G06F 11/1461 711/162 |
| 2006/0271815 | A1* | 11/2006 | Mizuno | G06F 11/2071 714/6.12 |
| 2006/0288178 | A1* | 12/2006 | Yagawa | G06F 11/2058 711/162 |
| 2007/0078861 | A1* | 4/2007 | Aidun | G06Q 10/10 |
| 2007/0180309 | A1* | 8/2007 | Zohar | G06F 11/2058 714/6.12 |
| 2007/0234108 | A1* | 10/2007 | Cox | G06F 11/2079 714/6.12 |
| 2008/0047013 | A1* | 2/2008 | Claudatos | G06F 21/562 726/24 |
| 2010/0169594 | A1* | 7/2010 | Tsaur | G06F 11/1461 711/162 |
| 2011/0167044 | A1* | 7/2011 | Hiwatashi | G06F 11/2082 707/652 |
| 2014/0237226 | A1* | 8/2014 | Berlin | G06F 9/4406 713/2 |
| 2015/0082081 | A1* | 3/2015 | Akirav | G06F 11/1453 714/6.22 |
| 2015/0234860 | A1* | 8/2015 | Sakaguchi | G06F 11/3419 707/622 |
| 2015/0242146 | A1* | 8/2015 | Shinozaki | G06F 12/0868 711/162 |
| 2015/0373116 | A1* | 12/2015 | Mo | G06F 3/0647 709/219 |
| 2016/0019224 | A1* | 1/2016 | Ahn | G06F 16/113 707/671 |
| 2016/0019317 | A1* | 1/2016 | Pawar | G06F 16/128 707/649 |
| 2016/0147615 | A1* | 5/2016 | Schefe | G06F 11/1451 714/19 |
| 2017/0317875 | A1* | 11/2017 | Zeng | H04L 29/08 |
| 2018/0032261 | A1* | 2/2018 | Singhai | G06F 12/023 |
| 2018/0083729 | A1* | 3/2018 | Wang | G06F 9/45558 |
| 2018/0143774 | A1* | 5/2018 | Carson | G06F 11/004 |
| 2018/0260124 | A1* | 9/2018 | Schucker | G06F 11/1469 |
| 2018/0329905 | A1* | 11/2018 | Christiansen | G06F 16/13 |
| 2019/0095297 | A1* | 3/2019 | Neall | G06F 11/1471 |
| 2019/0228081 | A1* | 7/2019 | Taig | G06F 16/9024 |
| 2019/0310926 | A1* | 10/2019 | Hashimoto | G06F 11/1471 |
| 2019/0346506 | A1* | 11/2019 | Schamber | G06Q 50/06 |
| 2019/0370379 | A1* | 12/2019 | Krojzl | G06F 11/2092 |
| 2020/0059376 | A1* | 2/2020 | Slovetskiy | H04L 12/1877 |
| 2020/0133500 | A1* | 4/2020 | Shang | G06F 11/2076 |
| 2020/0379647 | A1* | 12/2020 | Ikeda | G06F 3/0619 |
| 2020/0409803 | A1* | 12/2020 | Naidu | G06F 11/1451 |

* cited by examiner

DATA CONSISTENCY WHEN SWITCHING FROM PRIMARY TO BACKUP DATA STORAGE

BACKGROUND

Data management systems are often configured to maintain a primary copy of a data set on one or more primary data storage devices for directly servicing data transactions on behalf of computer software applications, as well as one or more backup copies, or replicas, of the data set, typically on one or more separate backup data storage devices. When the primary copy becomes unusable, such as due to equipment failure, a backup copy is typically used to continue servicing such data transactions.

Different techniques are used to maintain different degrees of synchronization between a primary copy and its replicas. With synchronous replication, changes are made to a primary copy and its replicas simultaneously, and a data transaction that results in a change to a data set is only completed once the change has been made to both the primary copy and its replicas. With asynchronous replication, changes that are made to a primary copy are made to its replicas after a delay, such as according to a predefined schedule, and thus a backup copy is in an inconsistent state relative to the primary copy whenever a change is made to the primary copy that has not yet been propagated to the backup copy.

Whether syncrhronous or asynchronous replication is used is often determined by business considerations, regulatory requirements, or both. Some data sets may include multiple data tables for storing different kinds of data, as well as various interdependencies between their data, where some kinds of data require synchronous replication, while other kinds of data require asynchronous replication. When switching from using a primary copy to a backup copy, such complexity makes it challenging to meet availability and consistency requirements, given the likelihood that the backup copy is in an inconsistent state.

SUMMARY

In one aspect of the invention a method is provided for switching from primary data storage to backup data storage in a data storage system, the method including preparing a backup copy of multiple data sets, where, prior to the preparing, the backup copy is updated in accordance with a backup protocol defined for the data sets, the backup protocol specifies synchronously updating the backup copy to reflect changes made to one type of data stored in a primary copy of the data sets, and the backup protocol specifies asynchronously updating the backup copy to reflect changes made to another type of data stored in the primary copy, and where the preparing includes identifying any inconsistency in any interdependent data in the data sets of the backup copy in accordance with a predefined schema of interdependent data in the data sets, and correcting any identified inconsistency in the data sets of the backup copy in accordance with a predefined inconsistency correction protocol, and causing the backup copy to be used in place of the primary copy for directly servicing data transactions.

In other aspects of the invention systems and computer program products embodying the invention are provided.

BRIEF DESCRIPTION OF THE DRAWINGS

Aspects of the invention will be understood and appreciated more fully from the following detailed description taken in conjunction with the appended drawings in which.

DETAILED DESCRIPTION

Figure 1A:
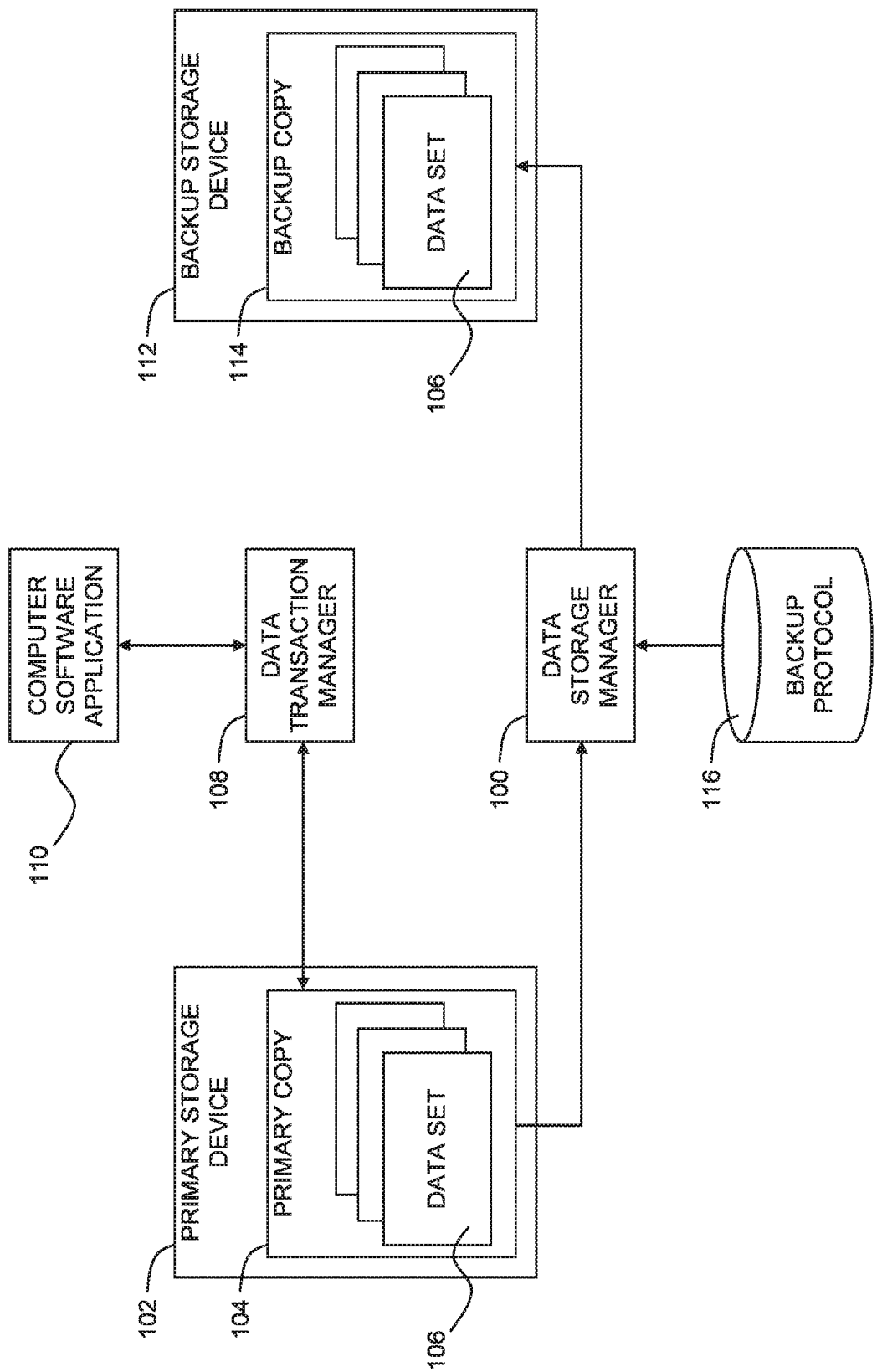
FIGS. 1A and 1B, taken together, is a simplified conceptual illustration of a data storage system constructed and operative in accordance with an embodiment of the invention.
Figure 1B:
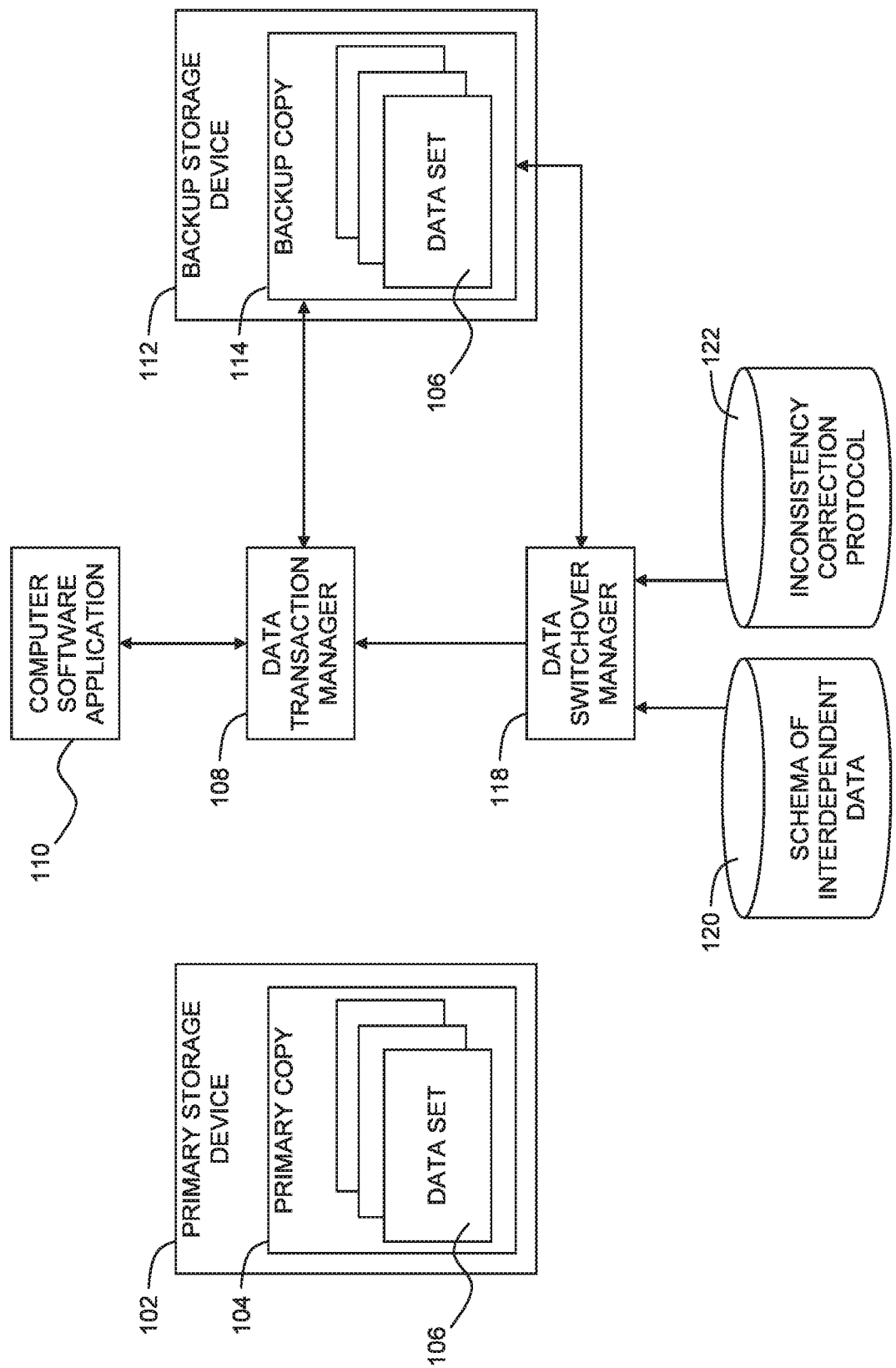

Reference is now made to FIGS. 1A and 1B, which, taken together, is a simplified conceptual illustration of a data storage system, constructed and operative in accordance with an embodiment of the invention. In FIG. 1A, a data storage manager 100 is configured to maintain, such as on a primary data storage device 102, a primary copy 104 of multiple data sets 106 for directly servicing data transactions by one or more computers on behalf of one or more computer software applications, such as by a data transaction manager 108 that directly service data transactions primary copy 104 on behalf of a computer software application 110. Data storage manager 100 is also configured to maintain, such as on a backup data storage device 112 that is separate from primary data storage device 102, a backup copy 114 of data sets 106. Data storage manager 100 is also configured to update backup copy 114 in accordance with a backup protocol 116 defined for data sets 106, where backup protocol 116 specifies that backup copy 114 is to be updated synchronously to reflect changes made to one or more types of data stored in primary copy 104, and also specifies that backup copy 114 is to be updated asynchronously to reflect changes made to one or more other types of data stored in primary copy 104.

In FIG. 1B, data switchover manager 118 is configured to facilitate switching to using backup copy 114 for directly servicing data transactions instead of primary copy 104, such as in response to equipment failure or other type of failure that precludes the continued use of primary copy 104 for directly servicing data transactions. Data switchover manager 118 is configured to prepare backup copy 114 by identifying any inconsistency in any interdependent data in data sets 106 of backup copy 114 in accordance with a predefined schema 120 of interdependent data in data sets 106. For example, where data sets 106 includes a table A and a table B, and schema 120 indicates that each record in table A is associated with a corresponding dependent record in table B when table A and table B are in a consistent state, data switchover manager 118 identifies an inconsistency if, in backup copy 114, a given record in table A lacks a corresponding dependent record in table B.

Data switchover manager 118 is also configured to correct any identified inconsistency in data sets 106 of backup copy 114 in accordance with a predefined inconsistency correction protocol 122. In one embodiment where, as in the example above, a first record in a first one of data sets 106 lacks an associated second record in a second one of data sets 106, data switchover manager 118 corrects the inconsistency in accordance with inconsistency correction protocol 122 by modifying the first record to include an association with an existing record in the second one of the data sets in place of the second record, such as where a timestamp of the existing record most recently precedes a timestamp of the first record. Thus, for example, if table B includes a series of security camera images, and a given record in table A lacks an associated image record in table B, the given record in table A is modified to be associated with an image record in table B whose timestamp most recently precedes the timestamp of the given record in table A.

Alternatively, data switchover manager 118 corrects the inconsistency in accordance with inconsistency correction protocol 122 by deleting the first record if an existing alternate first record in the first one of the data sets is associated with an existing alternate second record in a second one of the data sets and if a predefined backup requirement associated with the first and second data sets and applicable to the alternate first record and the alternate second record is satisfied. Thus, for example, if each record in table B includes a data snapshot, and a regulation requires the data snapshots to be propagated to backup copy 114 at least every 30 minutes, when in fact they are propagated to backup copy 114 every 10 minutes, and a given record in table A lacks an associated record in table B, the given record in table A is deleted if an alternate in table A is associated with a record in table B whose data snapshot was recorded within the preceding 20 minutes.

Alternatively, data switchover manager 118 corrects the inconsistency in accordance with inconsistency correction protocol 122 by creating a placeholder record in the second one of the data sets, such as including predefined generic data, and modifying the first record to include an association with the placeholder record. Thus, for example, if each record in table B includes a user photo, and a given record in table A lacks an associated record in table B, a placeholder record is created in table B with a generic silhouette image, and the given record in table A is modified to be associated with the placeholder record in table B.

In one embodiment, data switchover manager 118 analyzes all records in backup copy 114 of data sets 106 to identify any inconsistencies in their interdependent data. In an alternative embodiment, data switchover manager 118 primarily or exclusively analyzes those records in backup copy 114 of data sets 106 having timestamps indicating a time that is after a point in time of accepted data consistency for data sets 106, identifying and correcting inconsistencies only within the analyzed records. Thus, for example, if changes to table A are propagated to backup copy 114 every 5 minutes, and changes to its dependent table B are propagated to backup copy 114 every 10 minutes, data switchover manager 118 primarily or exclusively analyzes records in tables A and B in backup copy 114 having timestamps indicating a time less than 10 minutes prior to the time of the analysis.

After identifying and correcting inconsistencies in backup copy 114 as described above, data switchover manager 118 causes backup copy 114 to be used in place of the primary copy for directly servicing data transactions, such as by instructing data transaction manager 108 to directly service data transactions using backup copy 114 instead of primary copy 104.

Figure 2A:
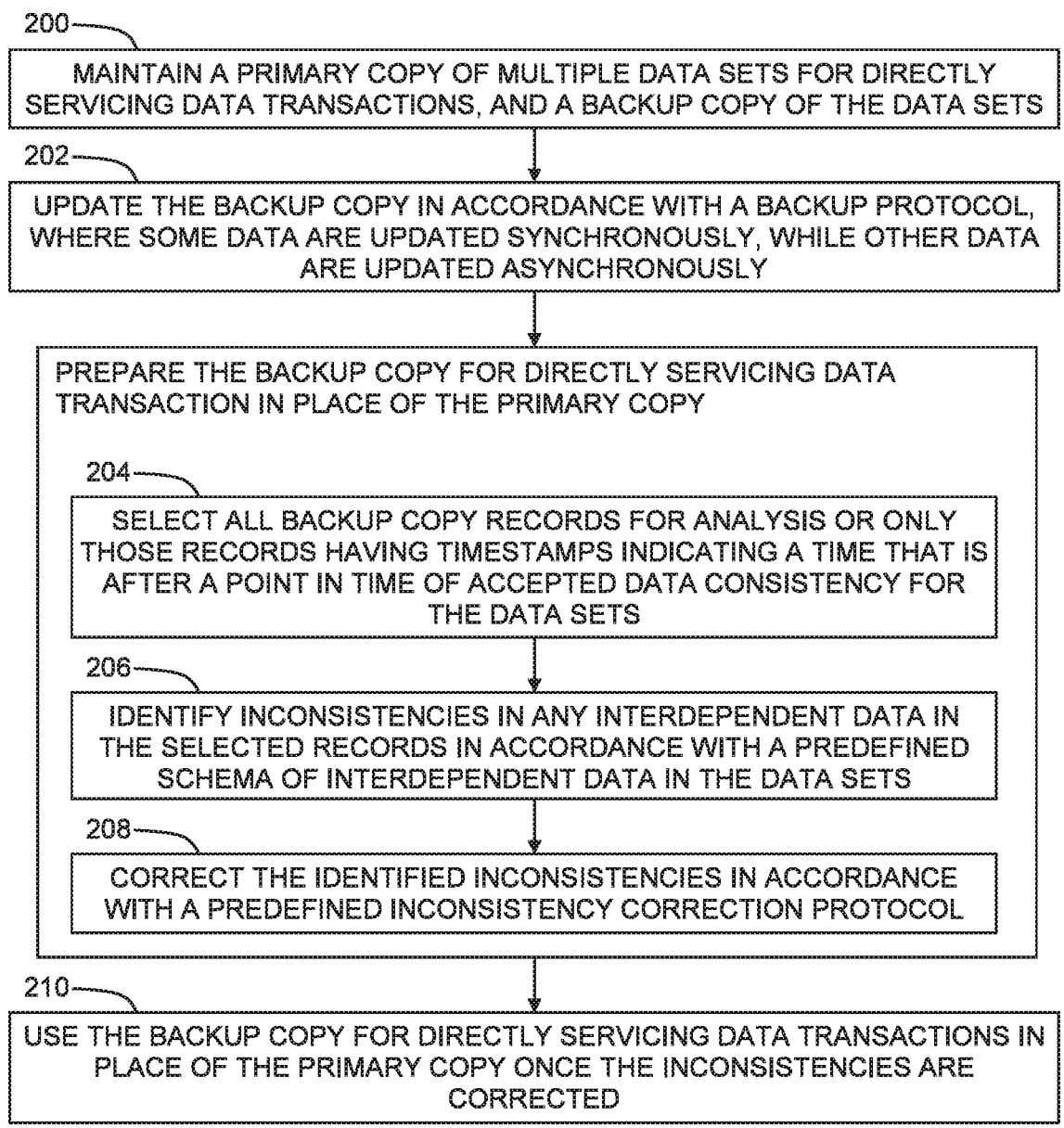
FIGS. 2A and 2B, taken together, is a simplified flowchart illustration of an exemplary method of operation of the system of FIGS. 1A and 1B, operative in accordance with an embodiment of the invention.
Figure 2B:
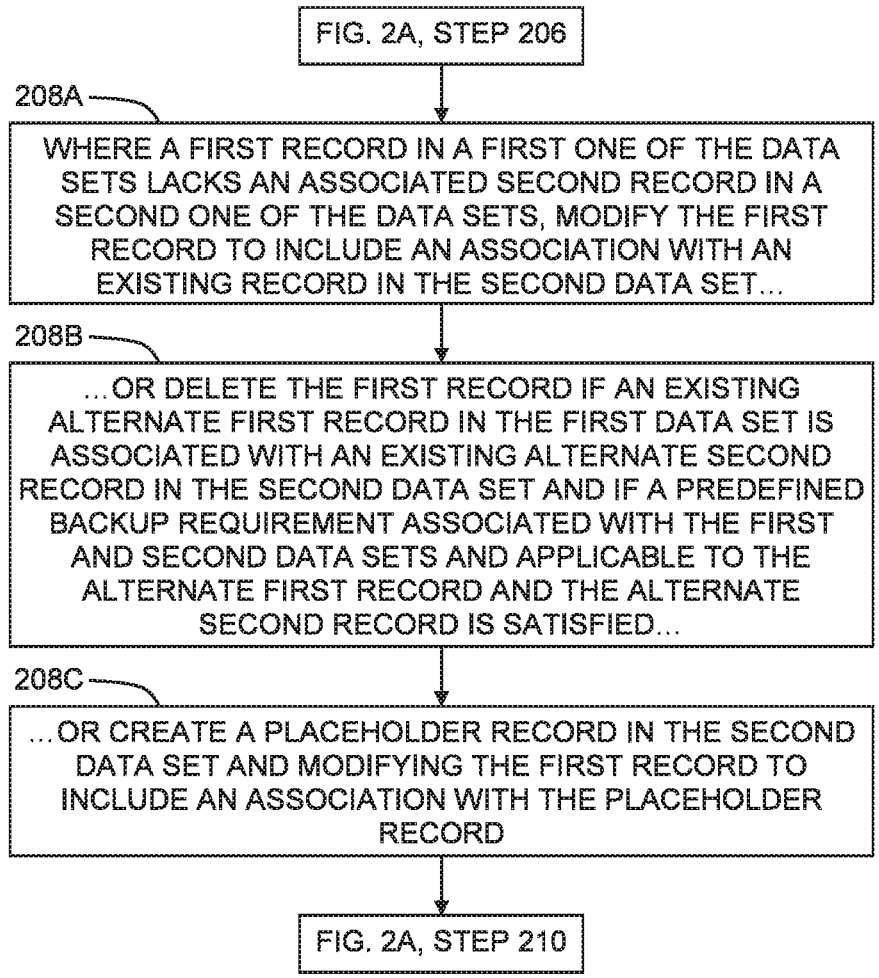

Reference is now made to FIGS. 2A and 2B, which, taken together, is a simplified flowchart illustration of an exemplary method of operation of the system of FIGS. 1A and 1B, operative in accordance with an embodiment of the invention. In the method of FIGS. 2A and 2B, a primary copy is maintained of multiple data sets for directly servicing data transactions by one or more computers on behalf of one or more computer software applications, as is a backup copy of the multiple data sets (step 200). The backup copy of the multiple data sets is updated in accordance with a backup protocol, where some data are updated synchronously, while other data are updated asynchronously (step 202). The backup copy is prepared for directly servicing data transactions in place of the primary copy as follows. Records in the backup copy are selected for analysis, such as all of the records, or only those records having timestamps indicating a time that is after a point in time of accepted data consistency for the data sets (step 204). Inconsistencies in any interdependent data in the data sets of the backup copy are identified in the selected records in accordance with a predefined schema of interdependent data in the data sets (step 206). The identified inconsistencies are corrected in accordance with a predefined inconsistency correction protocol (step 208), such as, where a first record in a first one of the data sets lacks an associated second record in a second one of the data sets, by modifying the first record to include an association with an existing record in the second data set (step 208A), by deleting the first record if an existing alternate first record in the first data set is associated with an existing alternate second record in the second data set and if a predefined backup requirement associated with the first and second data sets and applicable to the alternate first record and the alternate second record is satisfied (step 208B), or by creating a placeholder record in the second data set and modifying the first record to include an association with the placeholder record (step 208C). The backup copy is used for directly servicing data transactions in place of the primary copy once the inconsistencies are corrected (step 210).

Figure 3:
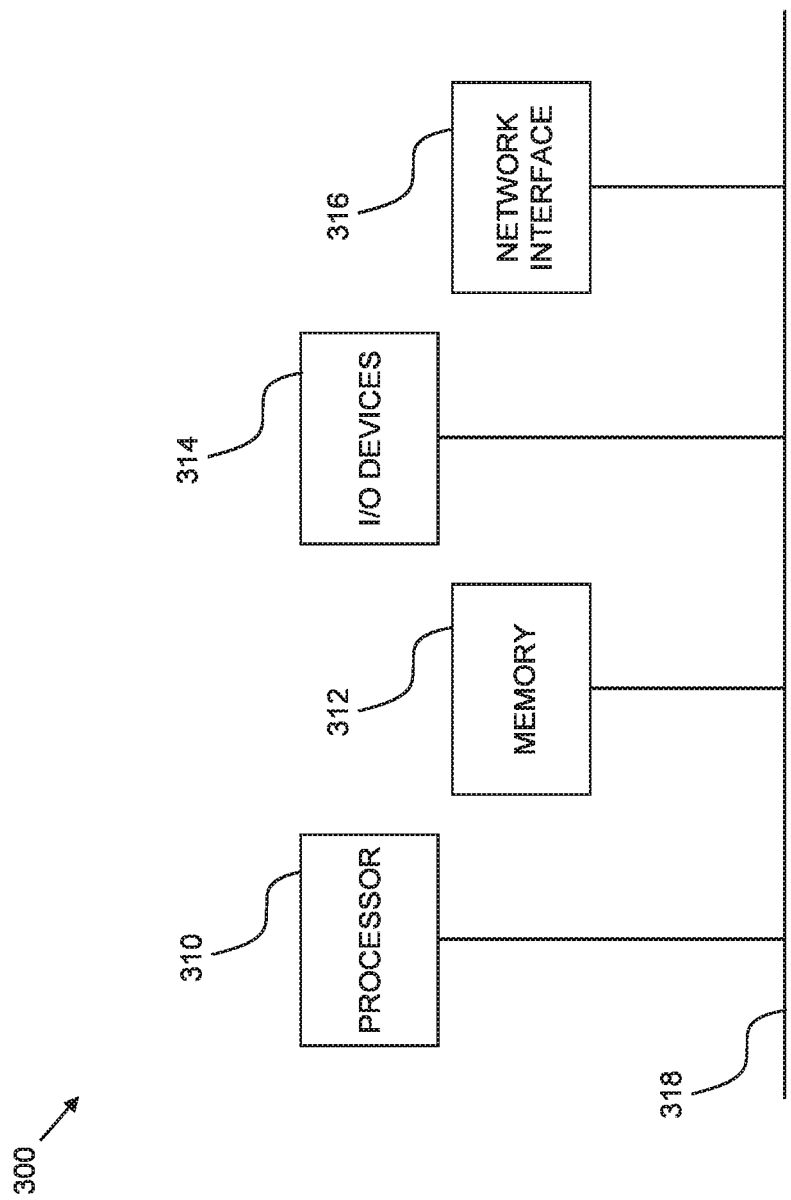
FIG. 3 is a simplified block diagram illustration of an exemplary hardware implementation of a computing system, constructed and operative in accordance with an embodiment of the invention.

Referring now to FIG. 3, block diagram 300 illustrates an exemplary hardware implementation of a computing system in accordance with which one or more components/methodologies of the invention (e.g., components/methodologies described in the context of FIGS. 1A, 1B, 2A, and 2B) may be implemented, according to an embodiment of the invention. As shown, the invention may be implemented in accordance with a processor 310, a memory 312, I/O devices 314, and a network interface 316, coupled via a computer bus 318 or alternate connection arrangement.

It is to be appreciated that the term "processor" or "device" as used herein is intended to include any processing device, such as, for example, one that includes a CPU (central processing unit) and/or other processing circuitry. It is also to be understood that the term "processor" or "device" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for switching from primary data storage to backup data storage in a data storage system, the system comprising:

a data storage manager configured to maintain
a primary copy of a plurality of data sets for directly servicing data transactions, and
a backup copy of the plurality of data sets, wherein
a backup protocol specifies synchronously updating the backup copy to reflect changes made to one type of data stored in the primary copy, and
the backup protocol specifies asynchronously updating the backup copy to reflect changes made to another type of data stored in the primary copy; and
a data switchover manager configured to
prepare the backup copy of the plurality of data sets by
a) identifying any inconsistency between any two interdependent data items in the data sets of the backup copy in accordance with a predefined schema of interdependent data in the data sets, and
b) correcting any identified inconsistency in the data sets of the backup copy in accordance with a predefined inconsistency correction protocol, and
cause the backup copy to be used in place of the primary copy for directly servicing data transactions.

2. The system according to claim 1 wherein the data switchover manager is configured to prepare the backup copy responsive to a failure that precludes continued use of the primary copy for directly servicing data transactions.

3. The system according to claim 1 wherein the data switchover manager is configured to identify an inconsistency where a first record in a first one of the data sets lacks an associated second record in a second one of the data sets, and correct the inconsistency by modifying the first record to include an association with an existing record in the second one of the data sets in place of the second record.

4. The system according to claim 1 wherein the data switchover manager is configured to identify an inconsistency where a first record in a first one of the data sets lacks an associated second record in a second one of the data sets, and correct the inconsistency by deleting the first record if an existing alternate first record in the first one of the data sets is associated with an existing alternate second record in a second one of the data sets and if a predefined backup requirement associated with the first and second data sets and applicable to the alternate first record and the alternate second record is satisfied.

5. The system according to claim 1 wherein the data switchover manager is configured to identify an inconsistency where a first record in a first one of the data sets lacks an associated second record in a second one of the data sets, and correct the inconsistency by creating a placeholder record in the second one of the data sets and modifying the first record to include an association with the placeholder record.

6. The system according to claim 5 wherein the placeholder record includes predefined generic data.

7. The system according to claim 1 wherein the data switchover manager is configured to analyze in the data sets, primarily or exclusively, records having timestamps indicating a time that is after a point in time of accepted data consistency for the data sets, and wherein the identifying and correcting are limited to the analyzed records.

8. A method for switching from primary data storage to backup data storage in a data storage system, the method comprising:
preparing a backup copy of a plurality of data sets,
wherein, prior to the preparing,
the backup copy is updated in accordance with a backup protocol defined for the data sets,
the backup protocol specifies synchronously updating the backup copy to reflect changes made to one type of data stored in a primary copy of the plurality of data sets, and
the backup protocol specifies asynchronously updating the backup copy to reflect changes made to another type of data stored in the primary copy, and
wherein the preparing includes
identifying any inconsistency between any two interdependent data items in the data sets of the backup copy in accordance with a predefined schema of interdependent data in the data sets, and
correcting any identified inconsistency in the data sets of the backup copy in accordance with a predefined inconsistency correction protocol; and
causing the backup copy to be used in place of the primary copy for directly servicing data transactions.

9. The method according to claim 8 wherein the preparing is performed responsive to a failure that precludes continued use of the primary copy for directly servicing data transactions.

10. The method according to claim 8 wherein the identifying comprises identifying in a first one of the data sets a first record lacking an associated second record in a second one of the data sets, and wherein the correcting comprises modifying the first record to include an association with an existing record in the second one of the data sets in place of the second record.

11. The method according to claim 8 wherein the identifying comprises identifying in a first one of the data sets a first record lacking an associated second record in a second one of the data sets, and wherein the correcting comprises deleting the first record if an existing alternate first record in the first one of the data sets is associated with an existing alternate second record in a second one of the data sets and if a predefined backup requirement associated with the first and second data sets and applicable to the alternate first record and the alternate second record is satisfied.

12. The method according to claim 8 wherein the identifying comprises identifying in a first one of the data sets a first record lacking an associated second record in a second one of the data sets, and wherein the correcting comprises creating a placeholder record in the second one of the data sets and modifying the first record to include an association with the placeholder record.

13. The method according to claim 12 wherein the placeholder record includes predefined generic data.

14. The method according to claim 8 wherein the preparing comprises analyzing in the data sets, primarily or exclusively, records having timestamps indicating a time that is after a point in time of accepted data consistency for the data sets, and wherein the identifying and correcting are limited to the analyzed records.

15. A computer program product for switching from primary data storage to backup data storage in a data storage system, the computer program product comprising:
a non-transitory, computer-readable storage medium; and
computer-readable program code embodied in the storage medium, wherein the computer-readable program code is configured to
maintain a primary copy of a plurality of data sets for directly servicing data transactions, and a backup copy of the plurality of data sets, wherein
a backup protocol specifies synchronously updating the backup copy to reflect changes made to one type of data stored in the primary copy, and the backup protocol specifies asynchronously updating the backup copy to reflect changes made to another type of data stored in the primary copy, prepare the backup copy of the plurality of data sets by
   a) identifying any inconsistency between any two interdependent data items in the data sets of the backup copy in accordance with a predefined schema of interdependent data in the data sets, and
   b) correcting any identified inconsistency in the data sets of the backup copy in accordance with a predefined inconsistency correction protocol, and
cause the backup copy to be used in place of the primary copy for directly servicing data transactions.

16. The computer program product according to claim 15 wherein the computer-readable program code is configured to prepare the backup copy responsive to a failure that precludes continued use of the primary copy for directly servicing data transactions.

17. The computer program product according to claim 15 wherein the computer-readable program code is configured to identify an inconsistency where a first record in a first one of the data sets lacks an associated second record in a second one of the data sets, and correct the inconsistency by modifying the first record to include an association with an existing record in the second one of the data sets in place of the second record.

18. The computer program product according to claim 15 wherein the computer-readable program code is configured to identify an inconsistency where a first record in a first one of the data sets lacks an associated second record in a second one of the data sets, and correct the inconsistency by deleting the first record if an existing alternate first record in the first one of the data sets is associated with an existing alternate second record in a second one of the data sets and if a predefined backup requirement associated with the first and second data sets and applicable to the alternate first record and the alternate second record is satisfied.

19. The computer program product according to claim 15 wherein the computer-readable program code is configured to identify an inconsistency where a first record in a first one of the data sets lacks an associated second record in a second one of the data sets, and correct the inconsistency by creating a placeholder record in the second one of the data sets and modifying the first record to include an association with the placeholder record.

20. The computer program product according to claim 15 wherein the computer-readable program code is configured to analyze in the data sets, primarily or exclusively, records having timestamps indicating a time that is after a point in time of accepted data consistency for the data sets, and wherein the identifying and correcting are limited to the analyzed records.

* * * * *